UNITED STATES PATENT OFFICE.

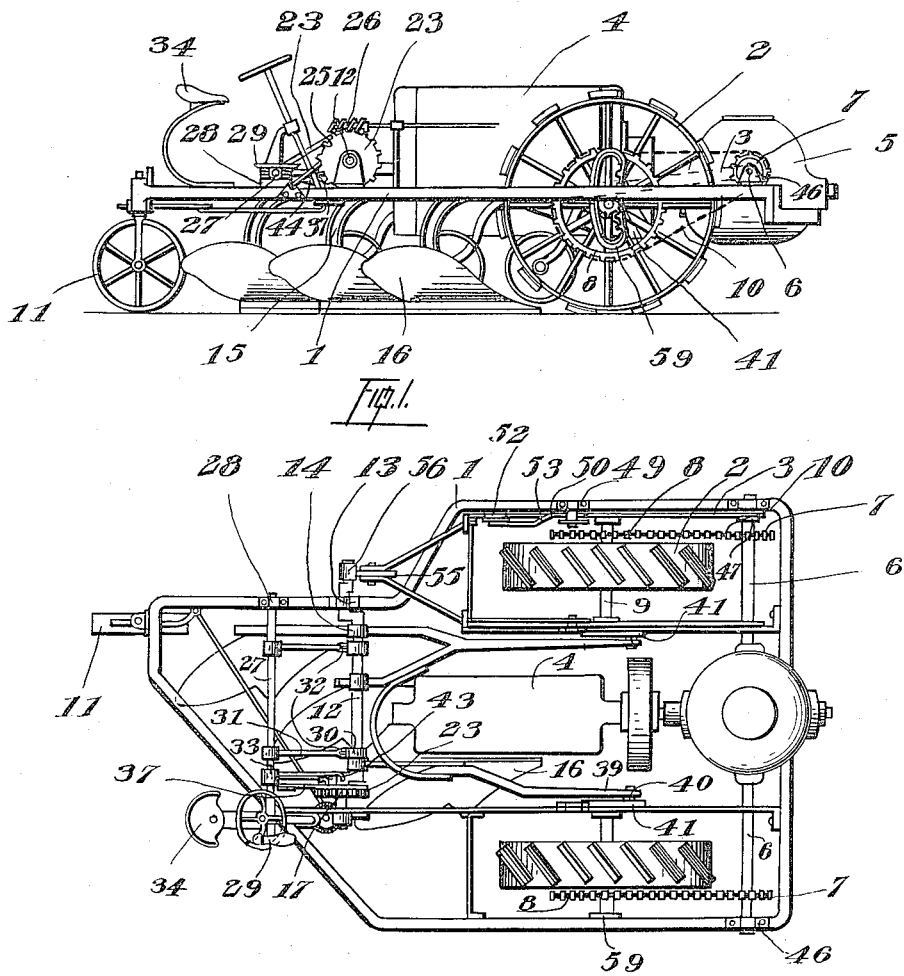

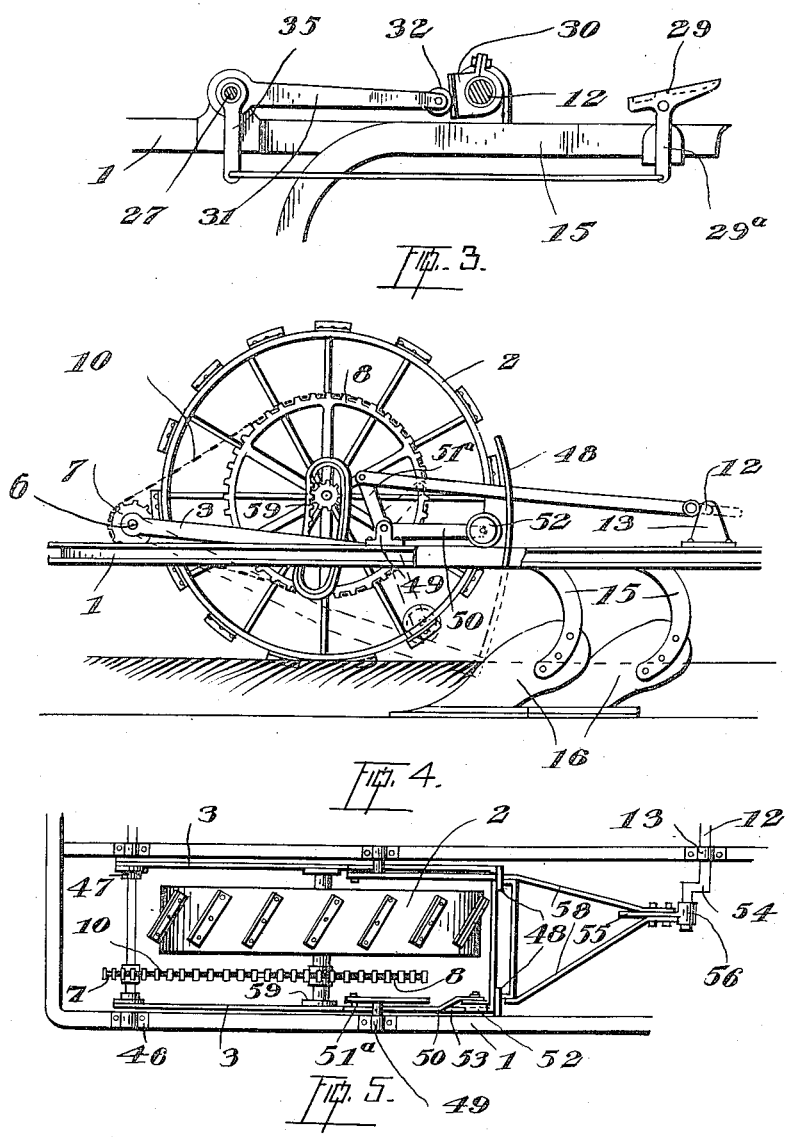

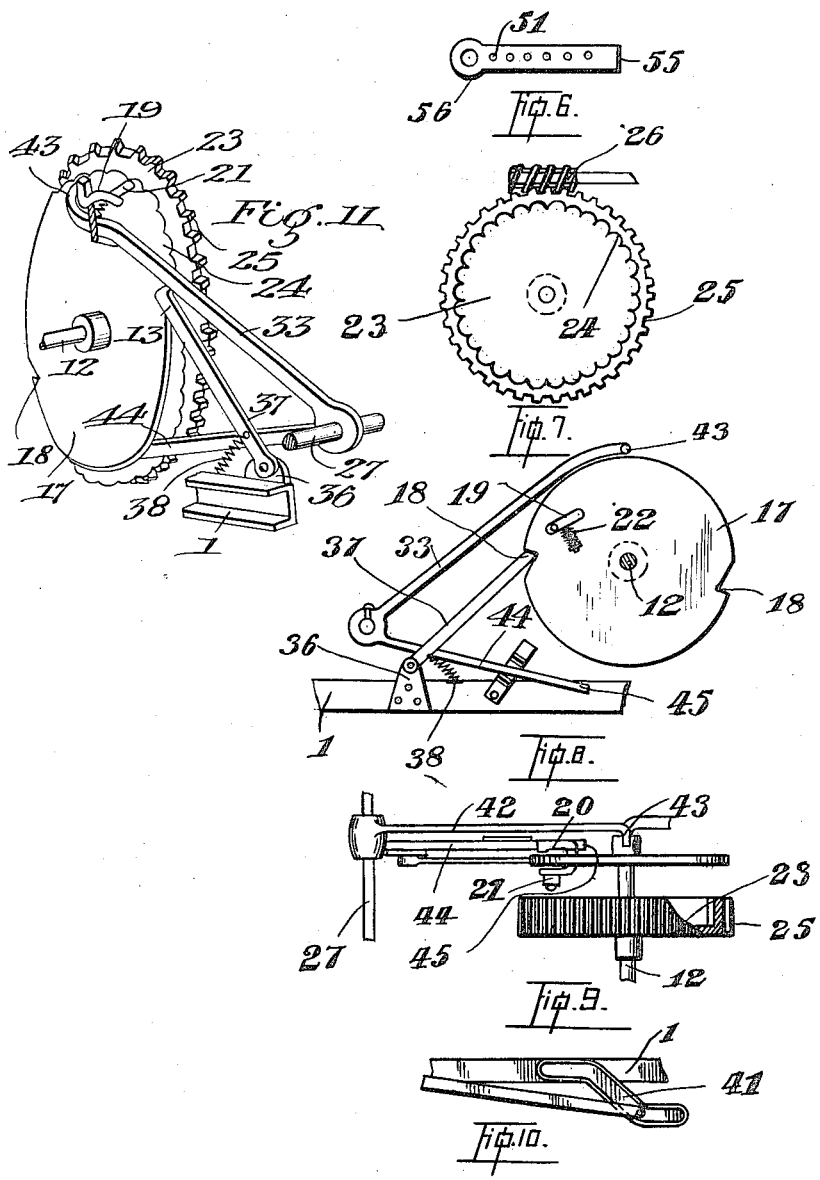

WILLIAM L. WALTON, OF BANTRY, NORTH DAKOTA.

CLUTCH FOR POWER-PLOW-LIFTING MECHANISM.

1,150,795.  Specification of Letters Patent.  Patented Aug. 17, 1915.

Original application filed June 12, 1912, Serial No. 703,239. Divided and this application filed December 24, 1913. Serial No. 808,621.

*To all whom it may concern:*

Be it known that I, WILLIAM L. WALTON, a citizen of the United States of America, and resident of Bantry, in the State of North Dakota, in the United States of America, have invented certain new and useful Improvements in Clutches for Power-Plow-Lifting Mechanism, of which the following is the specification.

This invention relates to improvements in clutches for power plow lifting mechanism and the objects of the invention are to generally improve and simplify the construction of the clutch and better adapt it to perform the functions required of it and to satisfy the conditions met with in actual practice. Such clutch is designed principally to be used in connection with the plow described and shown in my application Serial No. 703,239, filed June 12th, 1912. To understand its operation however it will be necessary to describe in detail the mechanism in connection with which it is used. This mechanism is covered by my application Serial No. 703,239, and other divisional applications of even date herewith. Serial Nos. 808,619 and 808,620.

The present application is a division of my aforesaid application Sr. No. 703239.

Figure 1 is a side elevation of the machine. Fig. 2 is a plan view thereof. Fig. 3 is an elevational detail to an enlarged scale of the blocks on the crank shaft, showing the projecting arms connected to the straight shaft having rollers on their ends engaging the blocks, and also the plow beams connected to boxes surrounding the crank shaft. Fig. 4 is a side elevation showing the bell crank lever and means for restoring the left wheel to the same level as the right wheel when the plows are inoperative. Fig. 5 is a plan view showing the sub-frame to which the left traction wheel is connected. Fig. 6 is a detail view of one of the plates connected to the end crank on the crank shaft. Fig. 7 is a side view of the cam wheel showing the circular corrugations on the innerside periphery and also the worm engaging the teeth on the outside periphery. Fig. 8 is a side view of the disk and trip dog. Fig. 9 is a plan view of the disk and cam wheel. Fig. 10 is a detail showing a side view of the front ends of the plow beams with rollers discharged to glide in suitable cams. Fig. 11 is a perspective view of the clutch mechanism.

In the drawings like characters of reference indicate corresponding parts in each figure.

1 is the main frame.

2 are the traction wheels, one of which is journaled to the sub-frames 3.

4 is a power plant and 5 transmission gear and 6 the counter shaft extending crosswise of the frame having sprockets 7 thereon.

8 are sprockets on the traction wheel axles.

10 are chains connecting the sprockets 7 and 8.

11 is the rear guiding wheel suitably pivoted to the main frame.

12 is the crank shaft extending crosswise of the frame having bearings 13 thereon.

14 are boxes surrounding the crank shaft and connected by the beams 15 to the plows 16.

17 is a disk keyed to the crank shaft having two notches 18 in the outside periphery thereof.

19 is a trip dog having a trip lever end 20 on the innerside of the disk and a roller end 21 on the outside thereof.

22 is a spring for keeping the roller end in contact with the circular projection 24.

23 is a gear wheel having circular projections 24 on its inside periphery and gear teeth 25 on its outside periphery meshing with a worm 26 on a shaft suitably driven by the engine or other source of power.

27 is a straight shaft having suitable bearings 28 on the main frame and a foot pedal 29 suitably connected thereto.

30 are blocks adjustably secured to the crank shaft 12.

31 are projecting arms suitably secured to the straight shaft 27 having rollers 32 at their forward ends engaging the aforesaid blocks.

33 is a trip fork secured to the straight shaft 27. In case the seat of the operator 34 is in some other position than that shown, then the modified device shown in Fig. 3 may be used, mounting the arm 35 on the straight shaft 27 and the pedal 29 with the arm 29ª attached in any desired position connecting the ends of the two arms by a suitable rod.

36 is a bracket secured to the main frame, 37 a stop dog held in contact with the outer periphery of the disk 17 by the spring 38, said stop dog engaging the notches 18 in the outside periphery of the disk and preventing the same from turning in one direction. The trip fork 33 has two arms, the one 42 having a hook end 43 and the other 44 having a stub end 45 so arranged that in operation either the hook end or the stub end will arrest the trip dog 19 and stop the forward revolving of the crank shaft 12.

In operation it will be no doubt desirable to have the stopping points of the crank slightly before the perpendicular center of revolution is reached.

The operation of the raising and lowering device is as follows: Assuming that the plows are in the lowered position as shown in Fig. 4, and it is desired to raise them, the wheel 23 will run loosely on a shaft 12 at a slow speed in the forward direction, being driven from the worm 26. The operator will press on the toe of the foot pedal 29 which will throw the stub or lower end 45 of the trip fork 33 and also the two locking arms 31 downwardly, releasing the trip dog 19 so that the roller of the said dog will drop into the corrugations 24 of the driving gear wheel 23, which will immediately start the crank to revolve, the arms 31 dropping sufficiently to clear the crank in its revolution. This movement will cause the hook end 43 of the trip fork 33 to drop into position so it will catch the trip dog 19 when it reaches the upper position and stop the further revolution of the crank 12 until the operator desires to lower the plows, when he will press down the heel of the pedal 29, releasing the hook end of the trip arm 33, when the crank shaft will again rotate and complete the other half of the revolution, this action of the operator having brought the stub end 45 of the trip fork 33 into position to intercept the trip dog at its lower position and at the same time bringing the locking arms 31 up into position to lock against the stop blocks 30.

The sub-frame 3 is a rectangular shaped yoke with its forward and open end formed with a large circular hole.

46 are brackets secured to the main frame formed so as to surround the transmission counter shaft which is arranged so that the ends of the sub-frame fit over the circular part of the same, which extends inwardly. The forward ends of the sub-frame are held in place by collars 47 also set on the brackets 46 to hold the frame in place. This arrangement allows the lowering and raising of the rear end of the sub-frame 3 and traction wheel 2 without disturbing the tightness of the driving chains 10. Guide pieces 48 are attached to the rear ends of the sub-frames and are intended to hold the sub-frame in line between the main frame bars when the former is raised and lowered within the main frame.

49 are brackets and 50 are bell crank levers pivotally connected thereto. The rear ends of the bell crank levers 50 are provided with rollers 52 having flanges on their inner edges, and the bell cranks being offset at 53 so that the outsides of the rollers will pass between the main frame bars. The rollers 52 rest upon the sub-frame 3 near its rear end and when the sub-frame is in its most elevated position it rests firmly against the bell cranks directly below the pivots of the brackets 49. An additional crank 54 is formed on the end of the crank shaft 12, this crank being set at approximately right angles to the plow lift crank. A plate 55 having a hollow boss 56 at its rear end is designed to be pivotally secured to the crank 54, having adjustment holes 51.

58 are connecting bars having their rear ends secured at each side of the plate 55 and their forward ends pivotally connected to the upper ends 51ª of the bell crank levers.

In operation the traction wheels will be adjusted by a worm wheel raising and lowering device in the rack bars 59 in order to adjust the same for the depth of plowing required. When the end of the field is reached and the plows are to be thrown out by the lifting device before described, the half turn of the crank shaft 12 will throw the crank 54 into rearward position, pulling the top end of the bell cranks 51ª backwardly as shown in the dotted lines in Fig. 4, thus throwing the rear end of the sub-frame 3 downwardly, carrying the left traction wheel down to the level of the right traction wheel, as in the one movement of the raising and lowering device. When the turn at the end of the field has been made, the other half revolution will allow the sub-frame 3 to return to its normal position between the main frame bars. It will be understood that the sub-frame 3 is only applied to the left hand or land wheel 2, the right hand or furrow wheel rack bars are bolted solidly to the frame.

From the above description it will be seen that the advantages of the raising and lowering will be great. Further as soon as the raising operation is started, it will be seen that the movement of the plow backward pulls the roller up a long incline of the cams 41, raising the points of the shares so that the plows cut their way out of the ground as they should do. By the time the crank has traveled backward for a requisite distance, the roller will have reached the top of the incline in the cams and the rear end of the plows will come more rapidly upward as the cam reaches the straight backward part of its revolution, finally passing to the full elevated position, the rollers traveling out to the end of the cam 41 and returning when the plows are fully raised. Then when the plows come to rest in the upper position, the rollers will be at rest, near the top of the incline part of the cam and as soon as the plows require to be let into the ground, the forward movement of the crank 12 will force the rollers down the incline of the cam 41 so that the points of the shares will dip down in and take the ground very readily and the action of the forward and downward revolution of the crank will set the plows down with a sweeping movement until they are finally in the ground in operative position. It will be seen, should the plows strike a rock or other obstruction, the trip will be thrown automatically and the plows raised clear of the obstacle.

What I claim as my invention is:

1. In a clutch, in combination, a rotary member having an annular series of projections, a shaft, a connecting member on the shaft fixed thereto, a spring actuated dog on the member having means normally engaging with the projections on the rotary members to thereby connect the rotary member and the connecting member, a double ended pivoted fork, the ends of which are adapted to disengage the dog at two points in its travel.

2. In a clutch, in combination, a rotary member having an annular series of projections, a shaft, a connecting member on the shaft fixed thereto, a spring actuated dog on the member having means normally engaging with the projections on the rotary members to thereby connect the rotary member and the connecting member, a double ended pivoted fork, the ends of which are adapted to disengage the dog at two points in its travel, and means for preventing retrograde movement of the connecting member.

3. A clutch for the purpose specified comprising a gear having projections, a disk having notches in the periphery, a dog on the disk adapted to engage with the projections to thereby connect the gear and the disk and cause them to rotate together, means for releasing the dog from the projections at predetermined points in the revolution, a spring actuated arm adapted to engage the notches in the periphery of the disk.

4. In a plow, a crank shaft, a clutch comprising a disk keyed to the crank shaft having a trip dog thereon with a trip lever end on the inside of the disk and an end extending through the disk to the outside having a roller mounted thereon, a spring for holding the trip dog outwardly from the center of the disk, a fork rod having one prong with a hook end designed to engage a trip dog on the disk, and the other prong having a stub end designed to engage the trip dog, a dog pivoted to a bracket on the main frame and held in engagement with the periphery of the aforesaid disk by a suitable spring, said disk having two notches in the outside periphery and a cam wheel loosely mounted on the crank shaft and having gear teeth on its outside periphery and circular corrugations on its inner periphery, said cam wheel being suitably driven from a suitable source of power, a spring for holding the said roller on the trip dog into engagement with the circular corrugations until the crank shaft is turned a requisite extent, said forked rod throwing the roller out of engagement at the required point, as and for the purpose specified.

5. In a plow, the combination with the crank shaft of a clutch comprising a disk keyed to the crank shaft having a trip dog thereon with a trip lever end on the inside of the disk and an end extending through the disk to the outside having a roller mounted thereon, a spring for holding the trip dog outwardly from the center of the disk, a fork rod having one prong with a hook end designed to engage a trip dog on the disk, and the other prong having a stub end designed to engage the trip dog, a dog pivoted to a bracket on the main frame and held in engagement with the periphery of the aforesaid disk by a suitable spring, said disk having two notches in the outside periphery, a cam wheel loosely mounted on the crank shaft and having gear teeth on its outside periphery and circular corrugations on its inner periphery, said cam wheel being suitably driven from the engine, a spring for holding the said roller on the trip dog in engagement with the circular corrugations until the crank shaft is turned a requisite extent, said forked rod throwing the roller out of engagement at the required point and a cross shaft situated behind the crank shaft and having a suitably connected foot pedal thereon, said fork rod being secured to the cross shaft, as and for the purpose specified.

6. In a plow, the combination with the crank shaft of a clutch comprising, a disk keyed to the crank shaft having a trip dog thereon with a trip lever end on the inside of the disk and an end extending through the disk to the outside having a roller mounted thereon, a spring for holding the trip dog outwardly from the center of the disk, a fork rod having one prong with a hook end designed to engage a trip dog on the disk, and the other prong having a stub end designed to engage the trip dog, a dog pivoted to a bracket on the main frame and held in engagement with the periphery of the aforesaid disk by a suitable spring, said disk having two notches in the outside periphery, a gear loosely mounted on the crank shaft and having gear teeth on its outside periphery and circular corrugations on its inner periphery, said gear being suitably driven from the engine, a spring for holding the said roller on the trip dog into engagement with the circular corrugations until the crank shaft is turned a requisite extent, said forked rod throwing the roller out of engagement at the required point, a cross shaft situated behind the crank shaft and having a suitably connected foot pedal thereon, said fork rod being secured to the cross shaft, blocks on the crank shaft having flat faces, projecting arms secured to the straight cross shaft, and rollers on the forward ends of the projecting arms engaging the flat surfaces of the blocks on the crank shaft, as and for the purpose specified.

In witness whereof I have hereunto set my hand in the presence of two witnesses.

WILLIAM L. WALTON.

Witnesses:
 H. M. WALTON,
 NELS MELOOS: